United States Patent [19]
Crisafulli

[11] 3,756,414
[45] Sept. 4, 1973

[54] OIL SKIMMER MODULE

[76] Inventor: Angelo J. Crisafulli, c/o The Crisafulli Pump Co., Inc., Box 1051, Glendive, Mont. 59330

[22] Filed: May 11, 1971

[21] Appl. No.: 142,282

[52] U.S. Cl. .......................... 210/242, 210/DIG. 21
[51] Int. Cl. ............................................. E02b 15/04
[58] Field of Search ................ 210/83, 242, DIG. 21

[56] References Cited
UNITED STATES PATENTS

| | | | |
|---|---|---|---|
| 1,591,024 | 7/1926 | Dodge | 210/242 |
| 3,219,190 | 11/1965 | Thune | 210/242 |
| 3,237,774 | 3/1966 | Schuback | 210/242 |

FOREIGN PATENTS OR APPLICATIONS

| | | | |
|---|---|---|---|
| 1,528,855 | 5/1968 | France | 210/DIG. 21 |

*Primary Examiner*—Samih N. Zaharna
*Assistant Examiner*—T. A. Granger
*Attorney*—Clarence A. O'Brien and Harvey B. Jacobson

[57] ABSTRACT

A skimmer for removal of a layer of oil or other floating pollutant from the surface of a body of water constructed in the form of a module employed with a desired number of similar modules for connection with a floating barge or other vessel for collecting and skimming off the oil when the barge or other vessel moves forwardly and discharging the collected oil or pollutant into storage tanks or the like incorporated into the barge or other vessel. Each oil skimmer module includes an open front receptacle having a horizontally disposed inclined front edge defining a weir that is capable of being raised or lowered for varying the depth of the weir in relation to the surface of the body of water. Each module also includes a pump for removing water and pollutants collected in the receptacle and discharging them into a suitable storage area such as settling tanks or the like on the barge or other vessel.

4 Claims, 5 Drawing Figures

Angelo J. Crisafulli
INVENTOR.

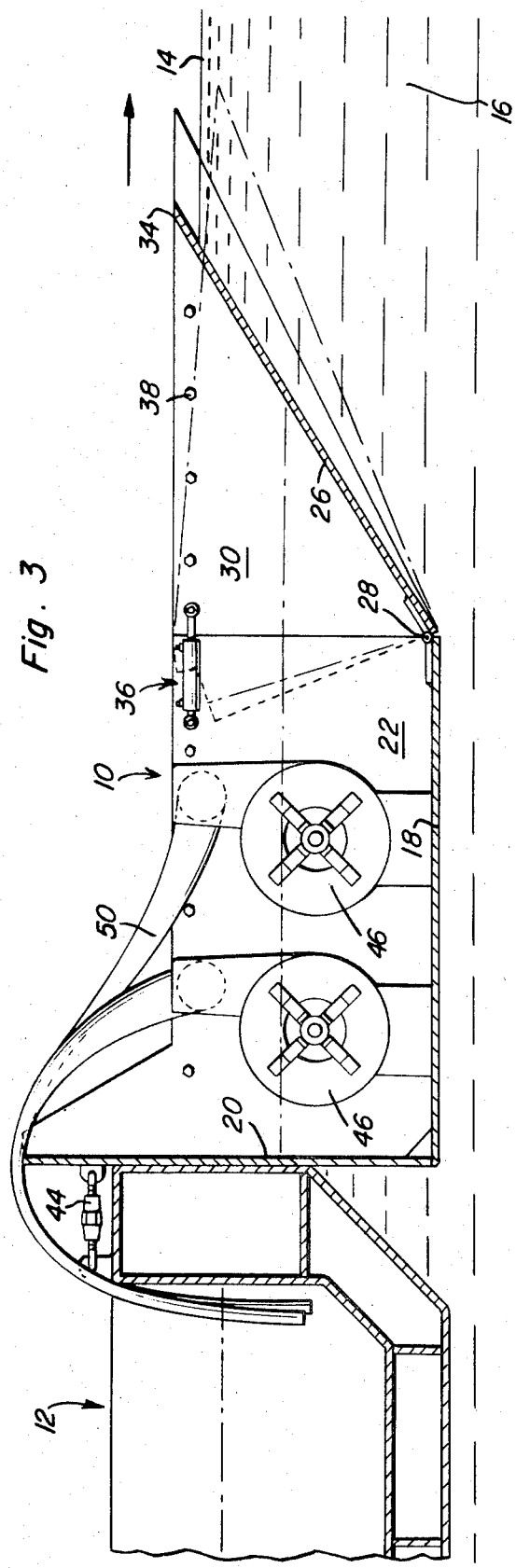
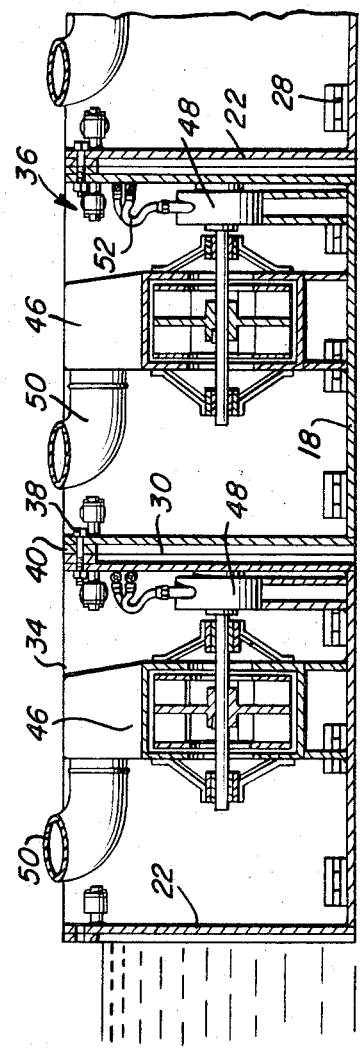
Angelo J. Crisafulli
INVENTOR.

OIL SKIMMER MODULE

BACKGROUND OF THE INVENTION

1. Field of the Invention

The present invention generally relates to oil skimming devices and more particularly to modules, each including a pump device, for connection to the bow of a floating barge or other vessel for the removal of a layer of oil or other floating pollutants from the surface of a body of water as the barge or other vessel moves forwardly.

2. Description of the Prior Art

Discharge of oil and other floating pollutants into rivers, lakes, streams and other bodies of water has become a problem which adversely affects the quality of the water. Many attempts have been made to remove floating oil from the surface of a body of water with such attempts including the use of absorbent materials to absorb the oil, the use of chemical additives to cause a change in the characteristics of the oil and the use of confining devices such as continuous floats or the like to prevent the spread of the oil with pump devices incorporated therein for removing the oil from the surface of the water. While all of these devices work, it frequently occurs that the floating pollutant is such that the area of pollution is so large to render ineffective the use of absorbent material, the addition of chemicals or the use of a confining float or other factors exist which render known procedures relatively ineffective.

SUMMARY OF THE INVENTION

An object of the present invention is to provide an oil skimmer module in the form of a receptacle having an open forward end that is vertically adjustably supported by swinging movement to enable a layer of oil, other floating pollutants and water mixed therewith to be collected into the receptacle, each module also including a pump for discharge of the material collected in the receptacle into a storage area or tank.

A further object of the invention is to provide an oil skimmer module adapted to be connected forwardly of a barge or other floating vessel with the barge or other floating vessel including storage tanks for receiving the material collected by the oil skimmer module and pumped thereto by the pump means.

A further object of the invention is to provide an oil skimmer module in accordance with the preceding object including generally parallel side walls on the receptacle to enable the side walls to be secured together in adjacent relation so that any desired number of modules may be connected to collect floating oil or other pollutants from a predetermined width of the body of water during each pass of the barge or other vessel along the surface of the body of water.

Still another object of the present invention is to provide an oil skimmer module in which the forward edge thereof is defined by a horizontally disposed inclined edge to effectively skim off the upper layer of the body of water and any pollutants thereon with a minimal turbulence being created thereby efficiently removing the oil or other pollutants from the surface of the water.

Yet another significant object of the invention is to provide an oil skimmer module which is quite simple in construction yet efficient in operation while being relatively inexpensive to manufacture and operate.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is a longitudinal, vertical sectional view taken substantially upon the plane passing along section line 3—3 of FIG. 2 illustrating the structural details of the module;

FIG. 4 is a transverse, sectional view taken substantially upon the plane passing along section line 4—4 of FIG. 2 illustrating further structural details of the module.

DESCRIPTION OF THE PREFERRED EMBODIMENT

Figure 1:
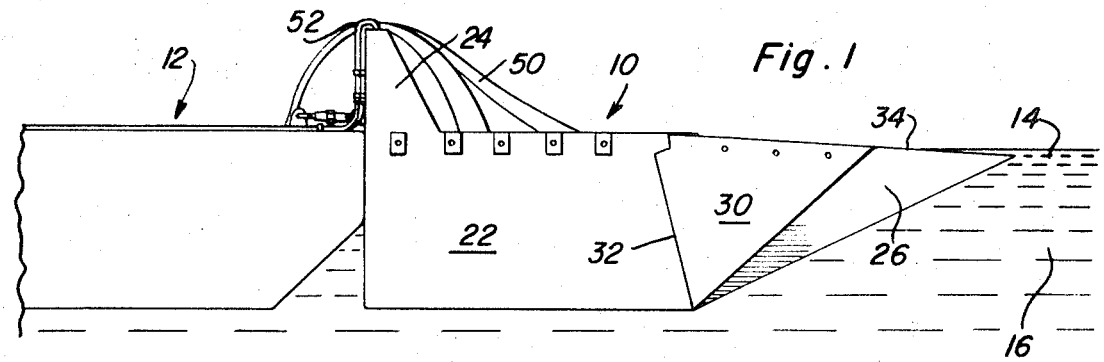
FIG. 1 is a side elevational view of the oil skimmer module connected to the bow of a barge.
Figure 2:
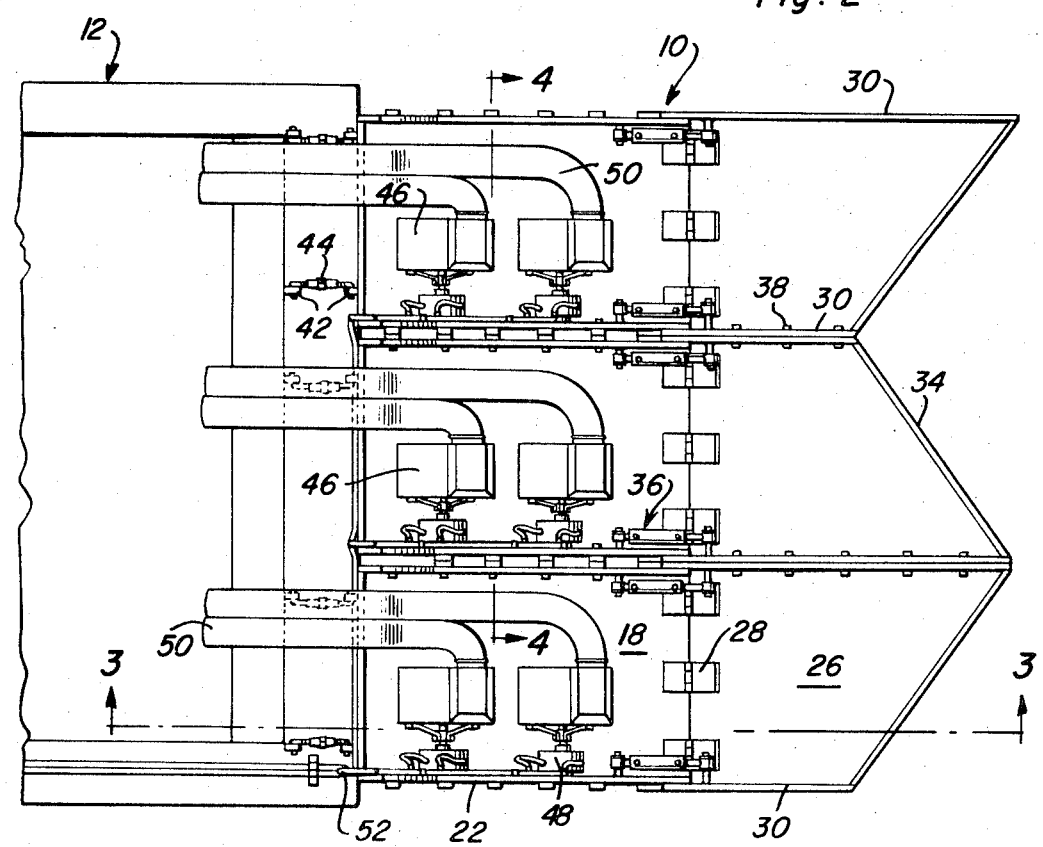
FIG. 2 is a top plan view of the construction of FIG. 1.
Figure 5:
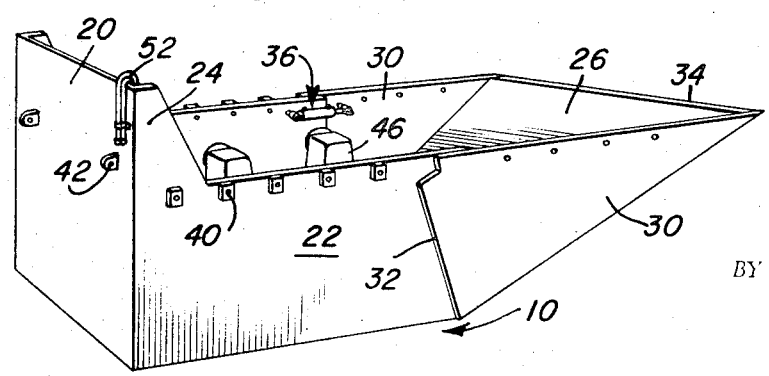
FIG. 5 is a perspective view of the oil skimmer module.

Referring now specifically to the drawings, the oil skimmer module of the present invention is generally designated by the reference numeral 10 with it being pointed out that the number of modules employed may be varied depending upon the over-all width of the barge or the width of the area from which the oil is to be collected during each pass of the module or modules. The module 10 is adapted to be mounted in front of a floating barge or other vessel 12 for removing the surface layer 14 from a body of water 16 when the surface layer 14 includes oil or other pollutants.

The oil skimmer module 10 includes a bottom wall or panel 18, an upstanding rear wall 20, and opposed substantially parallel and upstanding side walls 22. This structure defines a generally rectangular receptacle having an open front. As illustrated, the rear wall 20 extends above the top edges of the side walls with the reinforcing gusset 24 being provided therebetween but the relative dimensions of the side walls and rear wall may vary as may be the over-all dimensions of the module.

Attached to the front edge of the bottom wall 18 is an upwardly and forwardly inclined wall 26 hingedly attached to the bottom 18 by a hinge 28. The two side edges of the wall or panel 26 are each provided with an upstanding side wall 30 which is generally triangular in construction and provided with a rear edge 32 generally perpendicular to the wall 26 so that it overlaps the side walls 22 of the receptacle when the wall 26 is upwardly inclined which is its normal position. The forward edge of the wall 26 is defined by an inclined horizontal edge 34 which has its forwardmost portion at one side wall and its rearmost portion at the other side wall with the edge 34 being bevelled as illustrated in FIG. 3 to provide substantially a horizontally disposed cutting edge. The cutting edge 34 is swingable about the axis defined by the hinge 28 to orient the edge 34 at a desired elevation in relation to the surface of the body of the water. When in inoperative position, the edge 34 would be above the surface of the body of the water and while in operative position, it would be at a desired depth below the surface of the water for determining the thickness of the layer of oil and water removed from the surface of the body of water.

To vary the angular position of the panel 26 and the elevational position of the edge 34, an adjusting mechanism generally designated by the numeral 36 is provided between the walls 22 and the walls 30. Such adjustment mechanism may be in the form of a relatively small double acting hydraulically actuated ram connected with a suitable source of hydraulic pressure by suitable conduits, the details of which are not illustrated, so that the position of the cutting edge 34 may be varied from a remote point. Any suitable type of adjusting mechanism may be employed either hydraulically or manually actuated. The edge 34 defines a cutting edge and is submersible to define a cutting weir especially when the modules are oriented in pairs with the inclination of the cutting edge 34 forming a horizontally disposed V-shaped cutting edge which will remove the surface layer 14 with the least possible turbulence or disturbance of the surface of the water as compared with a straight across edge which would tend to build up a wave in front of the edge. The inclined construction of the edge 34 eliminates such a transverse wave and provides for substantially complete removal of a layer of oil or other pollutants of a predetermined thickness.

When securing a plurality of modules together, suitable fastening bolts 38 are employed to secure the walls 30 together and also secure the walls 22 together with the walls 22 having suitable spacers 40 thereon for providing a rigid interconnected structure.

The rear wall 20 of each module is connected to the bow of the barge 12 by any suitable means such as lugs 42 being provided on the rear wall 20 and on the deck of the barge with an adjustable connecting device such as a turnbuckle 44 adjustably interconnecting the lugs for securing the module securely but removably in relation to the barge 12. Also, any suitable structure may be incorporated in the attachment between the module and the barge to provide for vertical adjustment therebetween within certain limits. For example, a plurality of lugs may be provided to enable the module to be elevated in relation to the barge as the barge is loaded and increases its draft. Of course, adjustment of the cutting edge or weir 34 also will compensate for variation in the draft of the barge so that a constant thickness of the layer skimmed off the water surface may be obtained.

Disposed on the upper surface of the bottom 18 and supported by suitable mounting brackets is a pair of pump assemblies 46 each of which is driven by a suitable hydraulic motor 48, such as a conventional orbit type hydraulic motor. Each pump assembly 46 is provided with a discharge pipe or conduit 50 which may be in the form of a flexible hose or the like extending from the discharge thereof to a storage tank or area within the barge which may be of any suitable configuration and capacity and may be in the form of a settling tank or the like so that water discharged into the tank on the barge may be removed from the bottom thereof and returned to the body of water, thus increasing the over-all capacity of the storage area or tank in the barge. Also, fluid pressure conduits or hoses 52 are provided for powering the hydraulic drive motors 48 for the pumps. The details of the pumps are not illustrated but it is preferred to use centrifugal pumps such as illustrated in prior U.S. Pat. No. 3,371,614 issued Mar. 5, 1968, the dislosure of which is incorporated herein by reference and in which the pump casing is provided with dual inlets at the front and rear and provided with strut like supports for the drive shaft bearings and drive shaft having the dual impeller mounted thereon.

By governing the number of pumps as well as the size of the pumps in each module, the capacity of each module may be varied. One exemplary embodiment of the invention employs two pumps in each module having a diameter of 16 inches capable of pumping 160,000 gallons of water per minute when eight modules are used in the front of a barge. Any suitable structure may be employed for supplying hydraulic fluid to the hydraulic motors and ram. For example, a conventional hydraulic pump and fluid system powered by a suitable engine or motor may be employed and the discharge hoses or conduits may be any suitable conventional flexible material which enables flexibility of association of the barge and modules.

The foregoing is considered as illustrative only of the principles of the invention. Further, since numerous modifications and changes will readily occur to those skilled in the art, it is not desired to limit the invention to the exact construction and operation shown and described, and according all suitable modifications and equivalents may be resorted to, falling within the scope of the invention.

What is claimed as new is as follows:

1. A skimmer module adapted to be disposed adjacent the surface of a body of water having floating pollutants therein and comprising a substantially rectangular container having an open top and open front defined by a bottom wall, two side walls and a rear wall, an upwardly inclined plate having one edge connected by means of hinges to the front edge of the bottom wall of the container, said plate having two oppositely disposed triangular side walls extending upwardly therefrom and covering, partly and with a tight fit, the two side walls of the container, said plate having a sharp and slanting front edge to define a cutting weir, said triangular walls having inclined top edges joining with the ends of the front edge of the plate, means to pivot the plate about the hinges for raising and lowering the cutting weir in relation to the surface of the water, and pump means mounted in the bottom of the container, and discharge conduits connected thereto.

2. The module of claim 1 wherein the means to raise and lower the cutting weir are two oppositely disposed hydraulic rams each operatively connecting the upper portions of the partly overlapping container side walls and triangular walls.

3. The module of claim 1 wherein the upper edges of the side walls of the container and the upper edges of the triangular walls are provided with means for laterally connecting two modules which are mirror-identical.

4. The module of claim 1 wherein the rear wall of the container is provided with means to connect the module to a front portion of a barge or other vessel.

* * * * *